3,428,356
AUTOMATIC COUPLING FOR HOISTING HEAVY LOADS
Adolph Anderson, 238 39th Ave. S.,
West Richland, Wash. 99352
Filed Sept. 30, 1966, Ser. No. 583,287
U.S. Cl. 294—110   15 Claims
Int. Cl. B66c 1/38

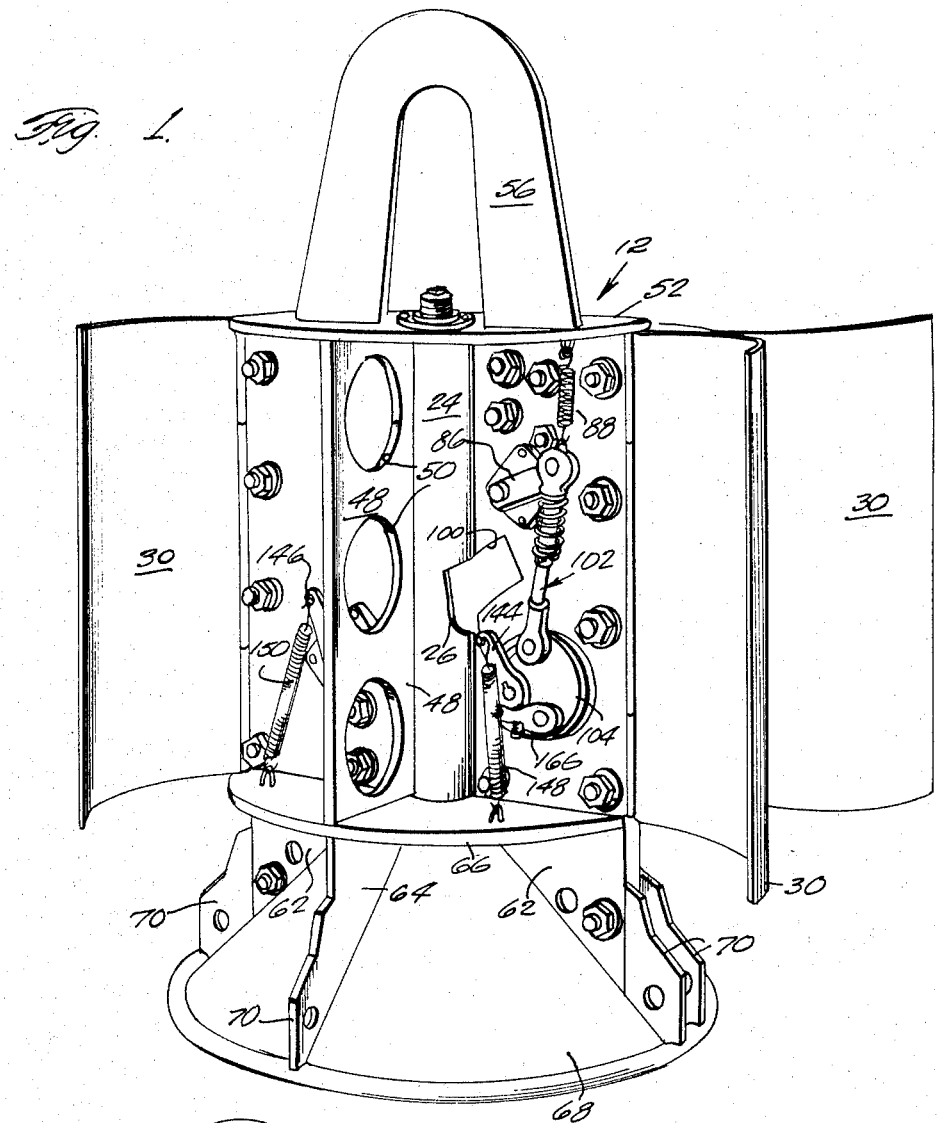
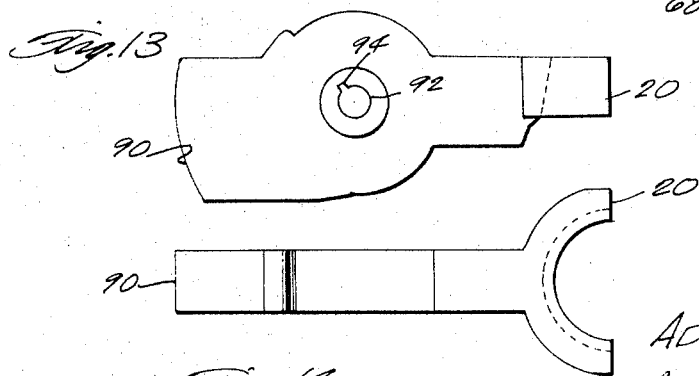

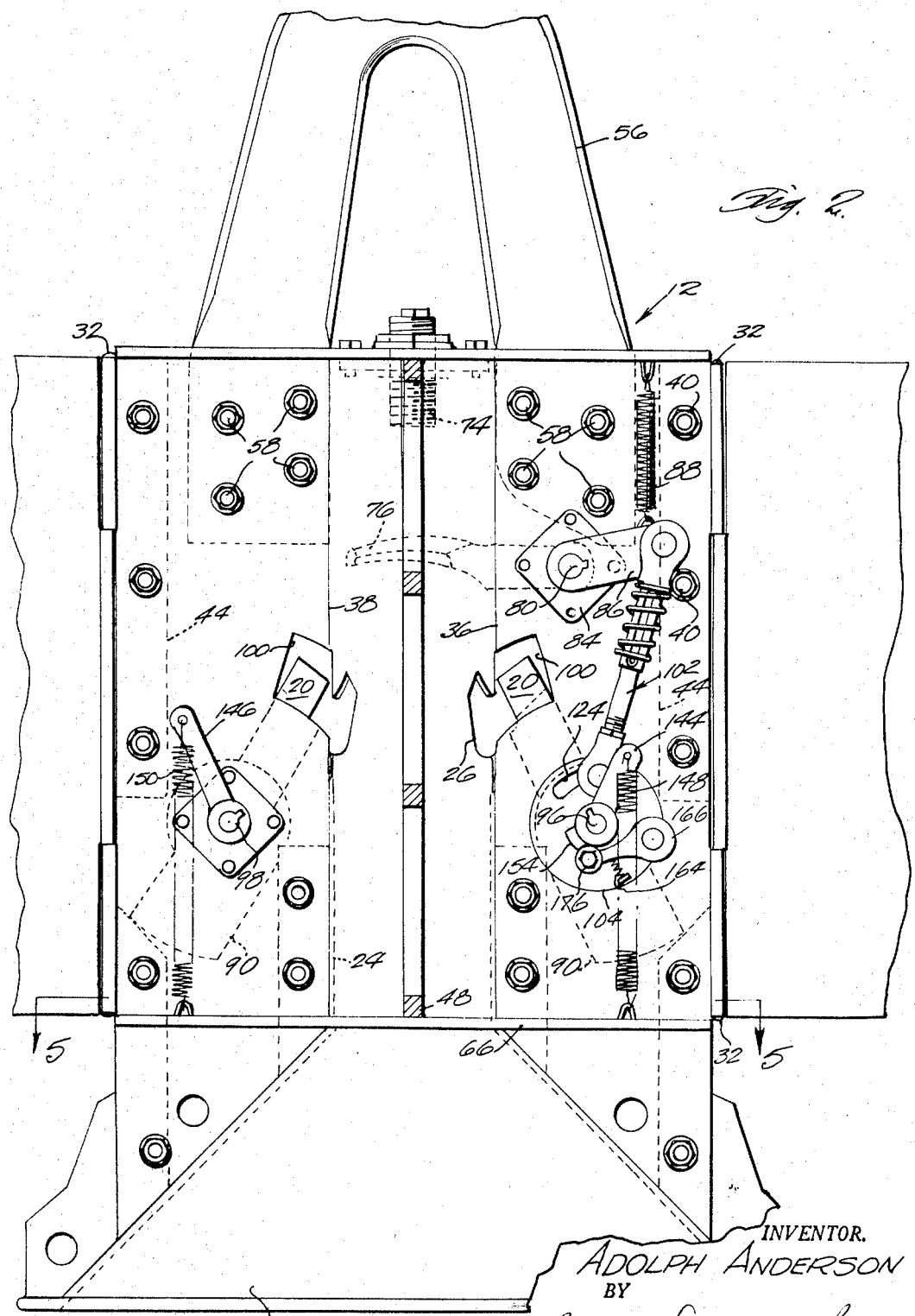

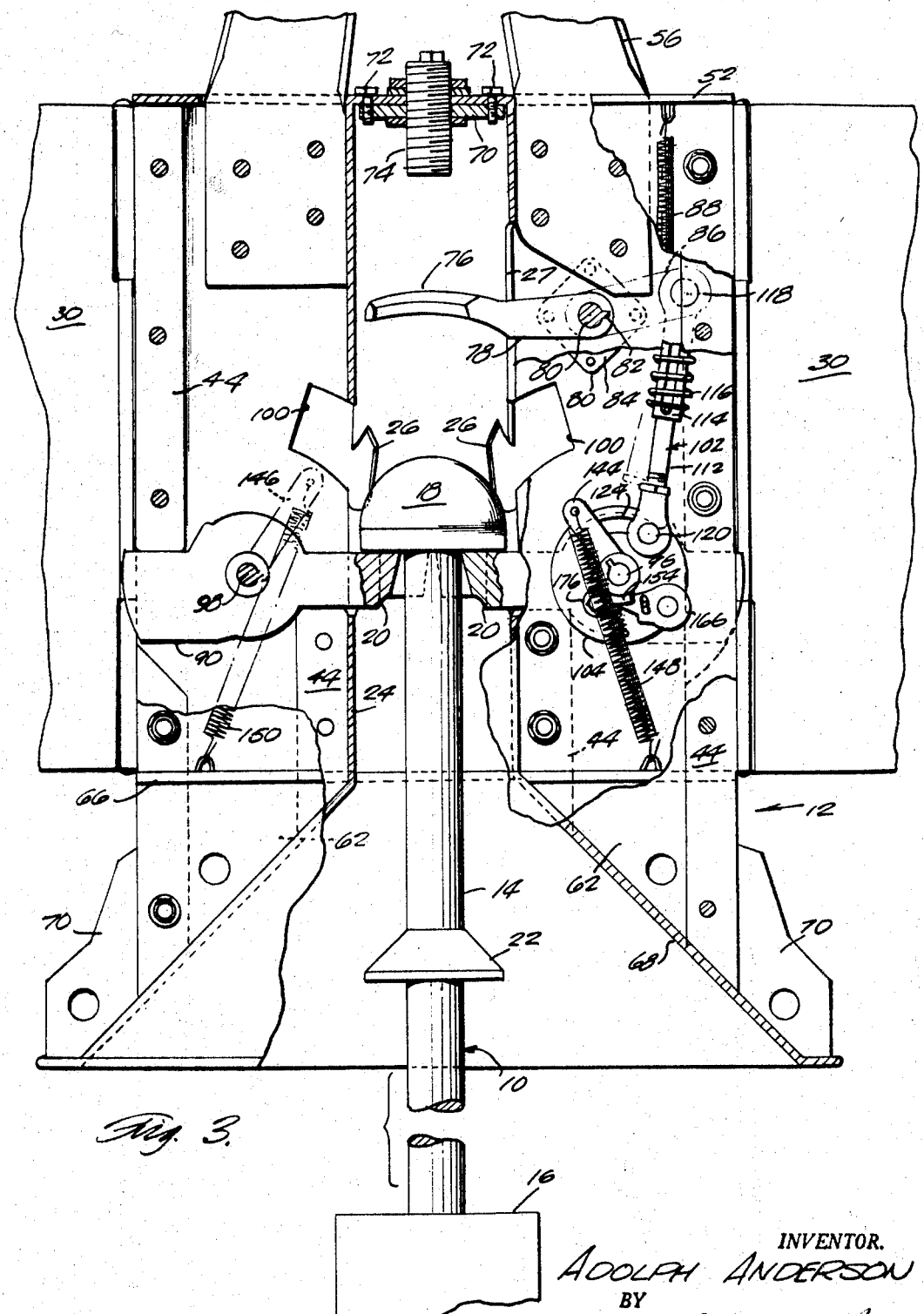

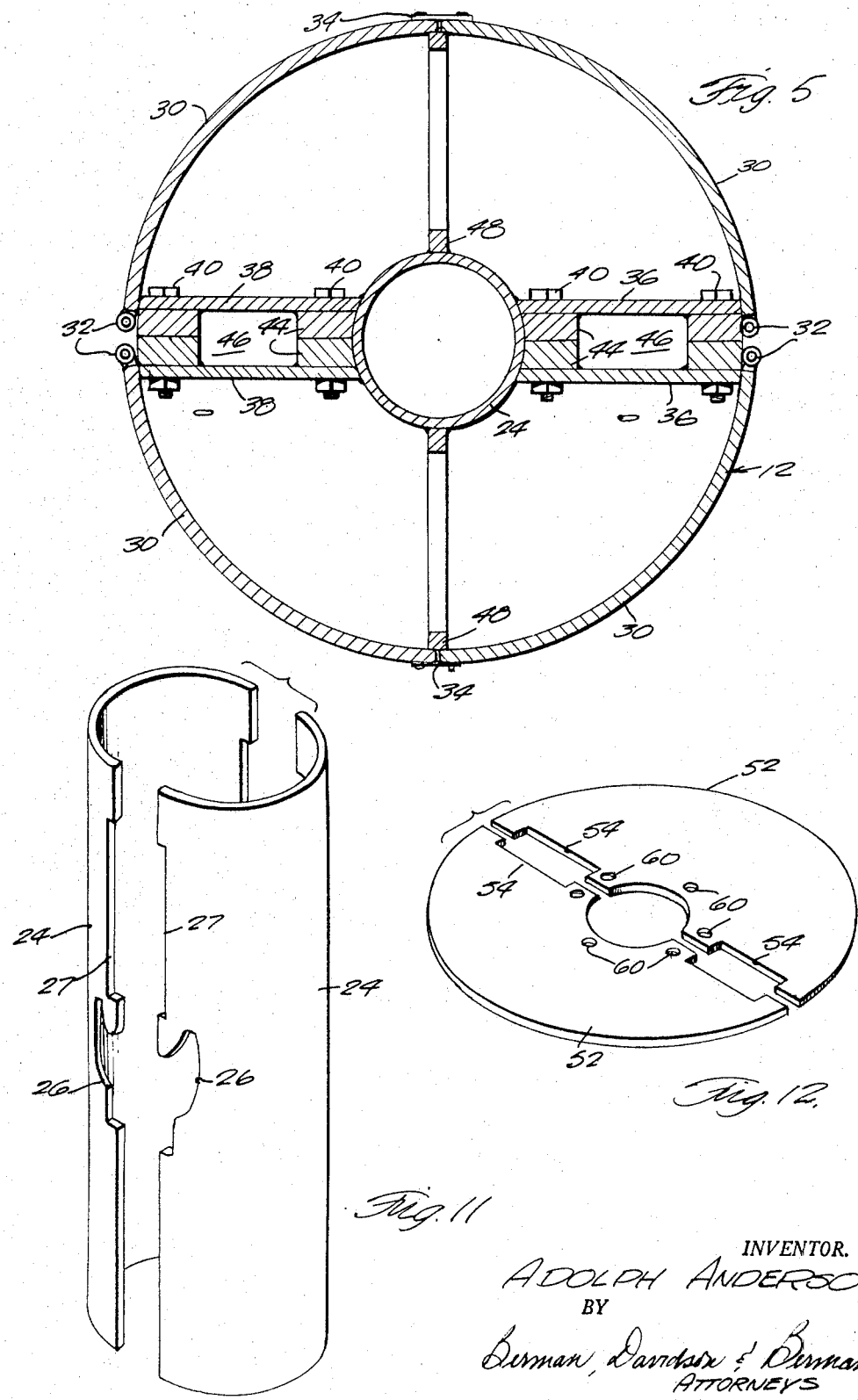

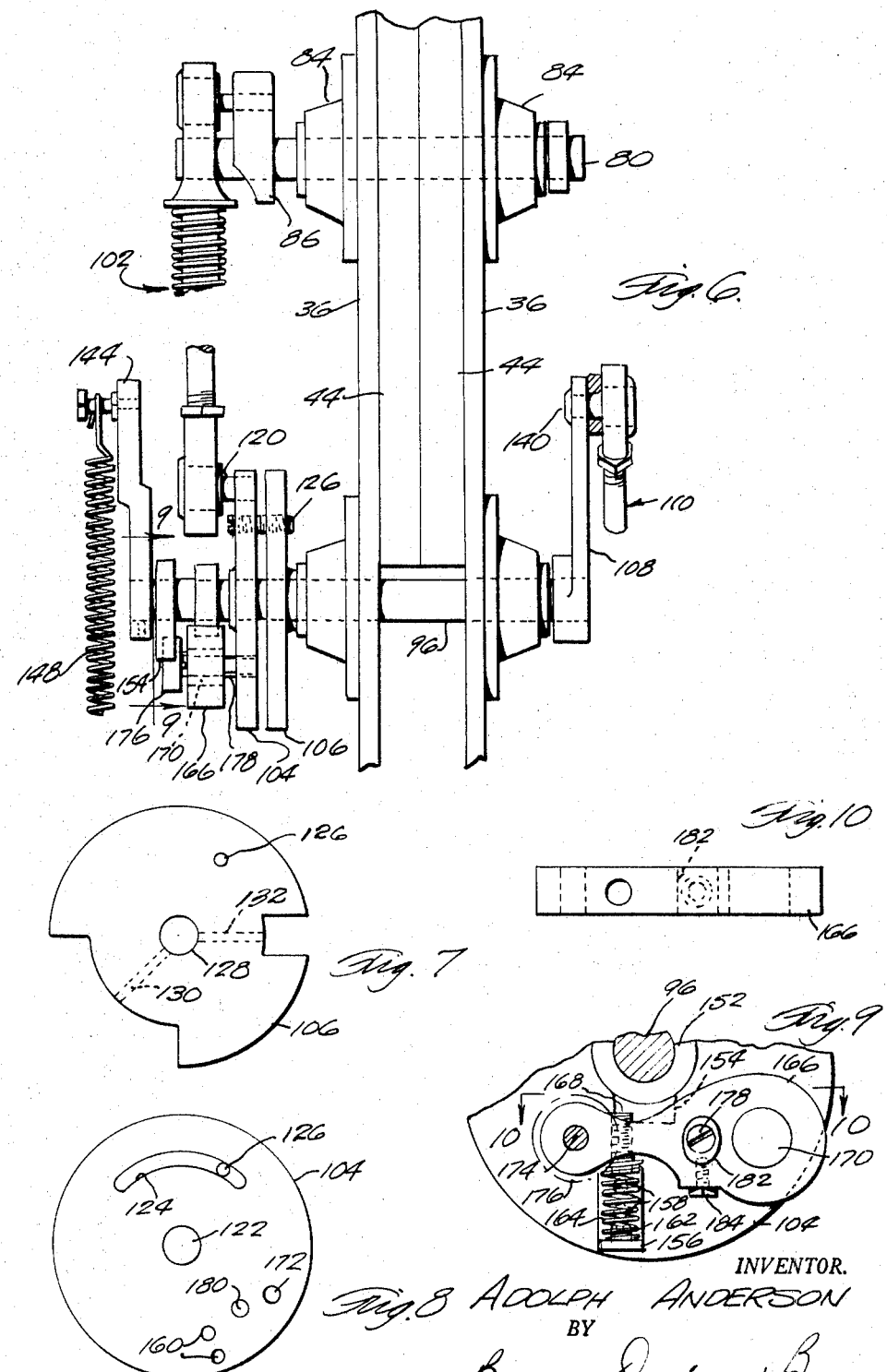

ABSTRACT OF THE DISCLOSURE

An automatic coupling for attachment to a hoist line, having a shape of an inverted funnel, and provided with an automatic, trigger operated latching mechanism.

---

This invention relates to coupling devices, and more particularly to a self-acting coupling, or hook, adapted to be used with a hoist or the like, and which automatically couples the hoist to the load upon performance of a first and second movement of the hook under control of the hoist operator without the need for stationing even one man at the hook or load to perform a direct coupling action. Uncoupling is performed by another pair of movements of the hook under control of the hoist operator.

It is a primary object of the invention to provide a coupling hook, for lifting heavy loads, which is self-acting to couple and uncouple without the need for manual assistance, the coupling and uncoupling taking place automatically by relative movements of the coupling and the load under control of the hoist operator in lifting and lowering the hooks.

It is an important object of the invention to provide a coupling hook, having the above-described characteristics, which saves manpower and thereby reduces operational costs.

It is another object of the invention to provide a coupling hook, having the above-described characteristics, which is of mechanical construction, designed to couple and uncouple only when the coupling is moved in a selected direction and then in the opposite direction, whereby accidental operation is not possible.

Yet another object of the invention is to provide an improved coupling hook having increased safety due to the avoidance of manual operation, and the prevention of accidental uncoupling and falling loads, whereby injury to persons, who with conventional hooks would normally be stationed under such falling loads, is eliminated.

A further object of the invention is to provide an automatic coupling hook, having the above-described characteristics, so designed as to couple and remain coupled without danger of accidental uncoupling due to swinging of the load on striking of the load against other objects, such as a load-receiving vehicle or a dam under construction.

A still further object of the invention is to provide an automatic coupling, having the above-described characteristics, which is capable of application in many industries as for example in heavy construction of dams, buildings and the like, in shipbuilding and shiploading, in oceanography where materials must be lowered into or raised from water, and in processes involving handling of nuclear and radiant materials which must be performed without direct or proximate contact of the materials with people.

Yet another object of the invention is to provide an automatic coupling, having the above-described characteristics, which is of relatively simple construction, easy to fabricate, and easy and economical to use.

The coupling hook according to the invention, which meets the above-described objects, is preferably embodied in two assemblages; (1) a mast for attachment to the load, and (2) a hook attachable to a lifting device. The hook is provided with a vertical, inner tube, whose bore presents a guide path for coupling and uncoupling movements of the mast. In the tube is positioned a trigger connected by linkage to a pair of pivoted jaws which when in uncoupled position are clear of the tube or path for upward movement of the mast. When the trigger is struck by the mast, the jaws are positively moved by the linkage to coupling positions across the bore of the tube and under a protuberance fixed to the top of the mast. Thus, when the hook is subsequently lifted the mast and load are lifted also, the jaws being locked in engagement with said protuberance by a pair of spring-biased toggle arms moved to overcenter positions by the coupling movement of the jaws. To release the load from the hook, it is necessary to first lower the hook so that the mast again rides upwardly against the trigger and away from the jaws. This movement causes the trigger to move the jaws in the opposite directions and out of the bore of the tube so that upon subsequent raising of the hook, the mast is free to leave the hook and out of the bore of the tube. In the uncoupled positons of the jaws, they are again locked by movement of said toggle arms to overcenter positions on the other sides of the jaw pivot shafts.

With the above brief outline of the structure and mode of operation, it should be clear that coupling is automatically performed first by downward movement of the hook followed by upward movement thereof to seat the mast protuberance on the jaws. Uncoupling is performed also by lowering the hook until the load rests on a substantially flat surface whereby to lift the mast protuberance from the jaws to engage the trigger. Complete separation of the hook then follows when the hook is lifted vertically. In this fashion, the hook is coupled and uncoupled automatically by a pair of opposite and sequenced movements in the preselected vertical direction, ruling out accidental uncoupling by movements in other directions, swinging movements, or by striking the load or the hook against other objects.

A coupling constructed as described has many advantages. For example, in the construction of dams where cranes are used with a conventional coupling to lift a heavy bucket of concrete, one or two men are positioned at the lading site to guide the crane operator and to connect the bucket to the crane hook. With the present device, these men are not needed, coupling and uncoupling taking place automatically by movements of the hook solely under control of the crane operator. The construction of the coupling device is such that once coupled it is impossible to uncouple without following a prescribed sequence of movements. Accidental uncoupling, therefore, cannot take place, yielding increased safety. The coupling hook can be made in any size to lift any load. A coupling, only five feet high and weighing between 400 and 500 pounds, has been constructed and has lifted a fifty ton load. It is conceivable that the coupling may be utilized for a great variety of purposes including the picking up and transporting loads by helicopters during military operations, as well as in the construction, shipbuilding, oceanography and nuclear activities previously mentioned.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIGURE 1 is a perspective view of the hook portion of a device according to the invention with the exterior shell doors open to reveal the mechanism within, some parts being omitted for clarity;

FIGURE 2 is a front elevation of the mechanism shown in FIGURE 1, with some parts in section and the coupling jaws in their uncoupled positions;

FIGURE 3 is a front elevation similar to FIGURE 2, except that the coupling jaws and associated parts are moved to their coupling positions and are shown coupled to a mast carrying a load;

FIGURE 5 is a horizontal cross-sectional view through the shell and frame members of the hook portion taken on line 5—5 of FIGURE 2 and looking in the direction of the arrows;

FIGURE 6 is a fragmentary side elevation of the jaw-operating mechanism;

FIGURES 7 and 8 are plan views of a pair of discs forming part of the jaw-operating mechanism;

FIGURE 9 is an enlarged fregmentary view taken on line 9—9 of FIGURE 6, and looking in the direction of the arrows;

FIGURE 10 is a plan view taken on line 10—10 of FIGURE 9, and showing only a cam arm forming part of the jaw-operating mechanism;

FIGURE 11 is a perspective view of a pair of inner, half tubes before assembly which when assembled form a guideway for coupling and uncoupling movements of the mast;

FIGURE 12 is a perspective view of a pair of half discs before assembly which when assembled form a top plate for the hook portion of the coupling device;

FIGURE 13 is an elevational view of one of the jaws of the coupling; and

FIGURE 14 is a plan view of the jaw of FIGURE 13.

Figure 4:
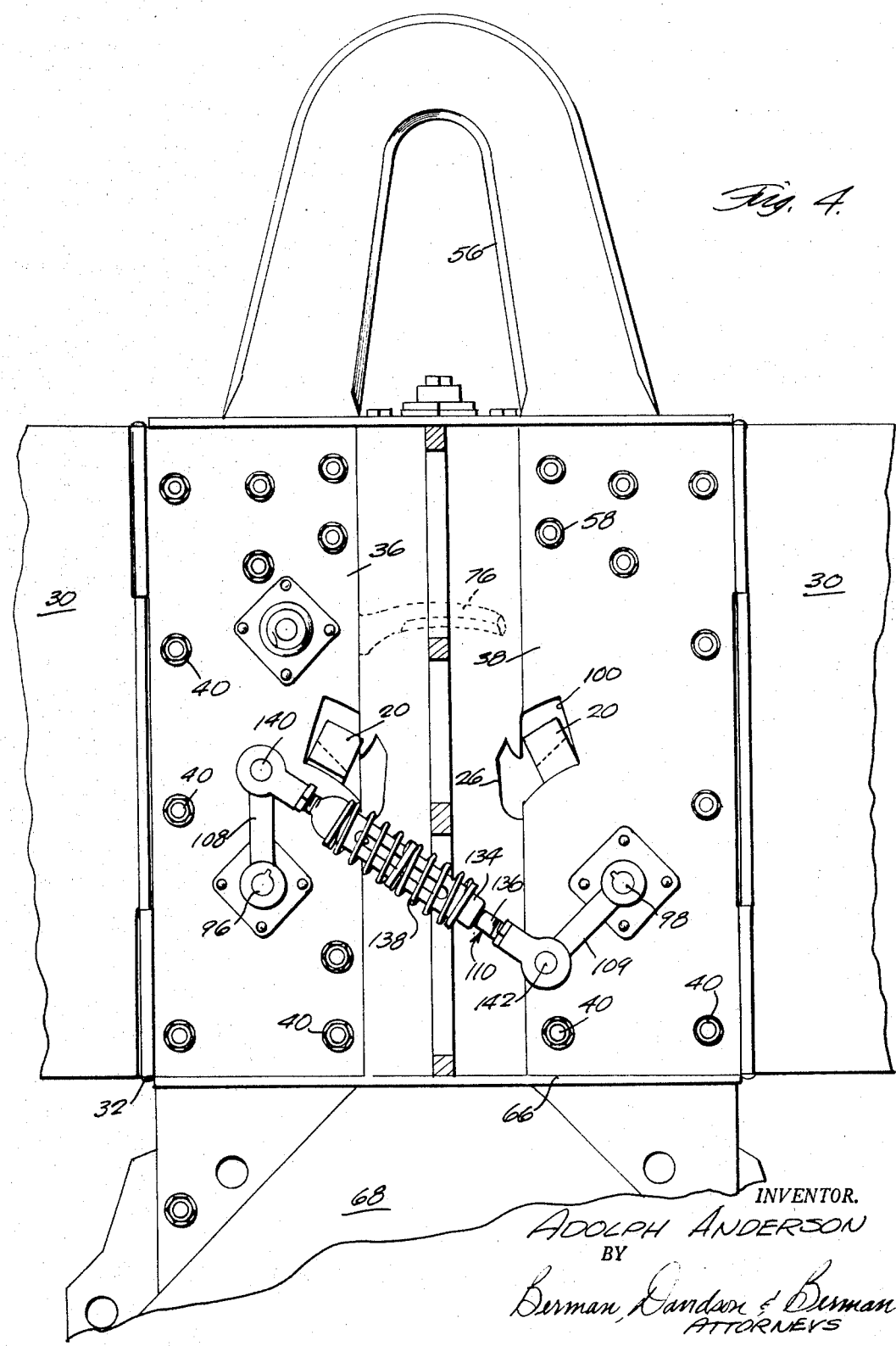
FIGURE 4 is a fragmentary rear elevation of the mechanism shown in FIGURES 1–3, with the jaws and associated parts shown in their uncoupled positions and the mast and load omitted.

Referring now more particularly to the drawings, a preferred embodiment of the invention is shown in FIGURE 3, as comprising a mast member, generally indicated by the reference numeral 10, coupled to a hook member indicated by the general reference numeral 12. The mast 12 comprises simply an elongated rod 14 which may be fastened in any suitable manner at its bottom to a load 16. The upper end of the rod is provided with an enlargement 18, desirably in the form of a hemisphere, the flat underside of which cooperates with a pair of pivoted jaws 20 operative to move into and out of the path of movement of the enlargement 18. A second enlargement, desirably in the form of a cone 22, is formed, welded, or otherwise suitably attached to the rod for centering and guiding the rod within the hook portion particularly at and near the upper limit of travel of the mast.

The hook 12 is best shown in FIGURES 1, 5, 11 and 12, as comprising an inner tube, a frame supporting a jaw operating mechanism, and an outer shell enclosing the mechanism. The inner tube is formed of two, complementary half tubes 24 which guide the mast during coupling and uncoupling. Each half tube is suitably cut out at 26, 27 to accommodate movement of one jaw 20 and the trigger, as will be further explained, and is welded, or otherwise suitably fastened to the other half tube to provide a single tube coaxially positioned with respect to an outer shell formed of four cylindrical segments 30 mounted to the frame on hinges 32 so that they are capable of opening, as shown in FIGURE 1, to provide access to the internal coupling mechanism. When closed, the outer cylinder segments 30 are secured together by hook type latches 34. The outer shell is fixed to and retained spaced from the inner tube by two pairs of spaced frame plates 36, 38 fastened together by bolts 40 and maintained parallel by interposed shear bars 44 leaving open chambers 46 between the plates which house the jaws, the trigger, and a portion of the jaw operating mechanism. At right angles to the plates 36, 38 are additional plates 48, for reinforcement of the structure, each of which may be provided with a plurality of large openings 50 therethrough for lightening the weight of the hook. The reinforcing plates 48 and pairs of frame plates 36, 38 are desirably welded to the inner tube to provide a strong rigid structure.

The tops of the plates 36, 38, 48 are covered by a pair of complementary, half annular plates 52, FIGURE 12, welded together to form a single disc-like cover and each having a pair of notches 54 located along the diameter to pass the legs of an inverted U-shaped, lift loop 56. The bottom of the loop legs are received in the chambers 46 between the frame plates and are secured to the latter by bolts 58, FIGURE 2. A plurality of openings 60 are disposed around the central opening in the cover parts 52 which receive securing screws, or bolts, for fastening a stop plate at the upper end of the inner tube 24, as will be later described.

The bottoms of the pairs of spaced frame plates 36, 38 and reinforcing plates 48 are extended below the bottom of the inner tube 24 by triangular portions 62, 64, respectively. At the level of the bottom of the inner tube is a bottom closure plate 66 formed of two annular discs similar to those forming cover plate 52. Fixed to the underside of the frame extensions 62, 64 is a frusto-conical body 68 having a smaller base equal in diameter to the diameter of the inner tube 24 and which functions to guide the enlargement 18 of the mast into the bore of the inner tube. Additional plates 70 are secured to the bottom portions 62, 64 of the frame plates to extend the frame outwardly to the large base at the bottom of the cone 68. All of the parts described above, except the shell doors 30, are rigidly secured to one another by bolts, welding or in other suitable ways to provide a strong rigid body capable of hoisting a heavy load.

The jaw-operating mechanism of the coupling hook will now be described, referring first to FIGURE 3. The central opening in the cover plate 52 is covered by a disc 70 secured by nuts 72 in the described openings 60. The disc has a central threaded opening for passage of a threaded stop 74 which is vertically adjustable to provide a desired upper limit for movement of the trigger 76.

The trigger is normally disposed in the bore of the inner tube 24 at a level below the stop 74 and at a sufficient distance, that is about the height of the mast enlargement 18, above the inner tube slots 26, so as to permit the jaws 20 to move out of said slots into their coupling positions across the inner tube, as shown in solid line in FIGURE 3. The trigger comprises an arm 78, which moves in the slots 27 of the inner tube 24 and between the frame plates 36, and whose free end is drilled to receive a stub shaft 80 and key 82 for pivoting the trigger. The stub shaft is mounted in bearings 84 affixed to the exteriors of the frame plates 36, as shown best in FIGURE 6. At the front of the forward frame plate 36, see FIGURE 2, an actuator arm 86 is keyed to a portion of the stub shaft which protrudes beyond the forward bearing block. A spring 88 biases the actuator arm upwardly so as to return the trigger to its normal position, as shown in FIGURE 3, after each coupling and uncoupling operation.

Each of the jaws 20 is a semiannulus, as best shown in FIGURES 13 and 14, having an integral arm 90 extending therefrom and which is enlarged along a substantial portion of its length away from the jaw to provide increased weight for gravity-urging the jaw upwardly about a pivot bore 92 which is notched at 94 to receive a key. Each jaw is thus keyed to one of two stub shafts 96, 98 with the jaws operating between the spaced frame plates 36, 38. The stub shafts 96, 98 are mounted in bearings similar, or identical, with the bearings 84 described for the shaft 80 pivoting the trigger. Thus, the jaws 20 when in uncoupling condition are upwardly inclined, outside of the path of movement of the mast in the inner tube, and received in notches 100 in frame plates 36, 38 which communicate with the notches 26 of the inner tube, see FIGURE 2. From these uncoupled positions, the jaws can swing toward each other, that is in opposite directions, to their coupling positions in which the jaws are disposed within the bore of the inner tube 24 and engage the flat bottom of the enlargement 18 when the mast 10 is lowered or the hook 12 is elevated.

A linkage mechanism connects the trigger to the pair of jaws to move the latter to their coupling and uncoupled positions. This mechanism includes the actuator arm 86 previously described, an actuator link 102, a pair of discs 104, 106, a pair of jaw throw-arms 108, 109, FIGURE 4, mounted on the shafts 96, 98 and pivotally connected to each other by a connecting link 110. The actuator link comprises a pair of telescoping arms 112, 114 connected by a pin and slot means to limit movement of the arm longitudinally of one another and biased apart by spring 116. One end of the actuator link is pivotally connected at 118 to the free end of the actuator arm opposite the end connected to the shaft, and the other end of the actuator link is pivotally connected by pin 120 to the disc 104. This disc is best shown in FIGURE 8 as comprising a central opening 122 which loosely fits about shaft 96, and coaxially therewith an arcuate slot 124 formed as a segment of a circle in which loosely rides a pin 126 fixed to the second disc 106, best illustrated in FIGURE 7. The disc 106 has a central opening 128 receiving shaft 96 and a pair of threaded passages 130, 132 leading from notches in the periphery of the disc to the central opening. Passages 130, 132 receive screws, or similar means, for fixing the disc 106 to the shaft 96. Thus, rotation of the disc 104 engendered by movement of the actuator link 102 results in rotation of the disc 106 and the shaft 96 to which a jaw 20 is fixed, with some lost motion purposely introduced to accommodate partial reverse movement of the disc 104 when the trigger 76 returns to its normal position. The length of the slot 124 and the position of the pin 126 can obviously be selected so that disc 104 will rotate with disc 106 through a suitable angle when the pin engages one end or the other of the slot 124.

Movement of the shaft 96, and the jaw 20 keyed thereto, also result in movement of the throw arm 108, FIGURE 4. The link 110 like the actuator link 102, previously described, is formed of two parts 134, 136 which telescope one within the other and which are biased apart by spring 138. One end of the link is pivotally connected at 140 to throw arm 108 and the other end is pivotally connected at 142 to the second throw arm 109 so that counterclockwise movement of the jaw 20 fixed to shaft 96 in FIGURE 4 through the described linkage moves the other jaw and its pivot shaft 98 clockwise, the two jaws moving from their uncoupling positions to their coupling positions. Of course, movement of shaft 96 and its connected jaw in the opposite direction, or clockwise in FIGURE 4, will through the described linkage turn the other jaw counterclockwise, and the jaws will return from their coupling positions to their uncoupling positions.

Referring to FIGURE 2, toggle arms 144, 146 are shown keyed at one end to shafts 96, 98 respectively, and in front of the front frame plates 36, 38. The toggle arms are inclined upwardly and outwardly and their free ends are biased downwardly by connected springs 148, 150 whose lower ends are hooked in fastening loops fixed to the bottom closure plate 66. Thus, as shown in FIGURE 2, when the jaws 20 are in their uncoupling positions, the toggle arms are over center of shafts 96, 98 and biased to stay in this condition by the coil springs 148, 150 so as to positively hold the jaws in their uncoupling positions. When, however, the jaws have been turned to their coupling position of FIGURE 3 by overcoming the tension of the springs 148, 150, the toggle arms 144, 146 move with the shafts 96, 98 and are inclined upwardly and inwardly. Thus, the toggle arms have moved over center of the shafts in the opposite direction and are again biased downwardly by the coil springs 148, 150 to positively hold the pair of jaws in their coupling positions.

Referring now particularly to FIGURES 6–10, the shaft 96 is keyed to a collar 152 having an integrally formed projecting cam 154 disposed to the left of disc 104 in FIGURE 6. An L-shaped bracket 156 is secured to disc 104 by a pair of screws 158 which enter the openings 160 in the disc. The foot of bracket 156 extends outwardly, perpendicular to the disc 104, and has affixed thereto a small stud 162 around which is seated a coil spring 164 with its bottom resting on the bracket. The upper end of spring 164 engages a cam follower arm 166 seating about another stud 168. The follower arm is pivoted about the pin 170 which seats in opening 172 in the disc 104. At the free end of the follower arm is mounted a stub axle 174 which rotatably mounts a cam follower wheel 176. The disc 104 also has a screw 178 threaded into the opening 180, the screw and its enlarged head is surrounded by an oval-shaped opening 182 in the follower arm to limit the pivotal movement thereof. In order to adjust the amount of this pivotal movement, another screw 184 is threaded from the exterior of the follower arm into the oval aperture 182. The cam 154, in moving from its FIGURE 2 position to its FIGURE 3 position under actuation of the trigger and linkage mechanism, moves with a force which exceeds the restraining force of the cam follower spring 164, so that the cam overrides the follower wheel 176 depressing the follower arm 166 and takes position on the other side of the wheel 176. A similar action occurs upon reverse movement of the cam from the FIGURE 3 to the FIGURE 2 position, so that the cam and follower arm do not prevent movements of the jaws 20 to coupling and uncoupling positions. However, once either of these movements are completed, the linkage mechanism under the influence of trigger spring 88 tends to move back toward its initial position corresponding to the normal position of trigger 76. Such return movements of the linkage mechanism move the actuator link 102 and the disc 104 back to their initial positions, or close thereto, but are not desired to reverse the movement of the jaws 20, the shafts 96, 98 or the disc 106. The function of the cam, follower arm and wheel assembly is to prevent such reverse motions of the jaws and disc 106 on return of the linkage mechanisms to neutral condition. The strength of the cam spring 164 is sufficient to prevent reverse turning of the disc 106 and the shaft 96 and connected jaw.

The described structure operates in the following manner. Assuming that the parts are in their positions illustrated in FIGURE 2, and that with a load attached to the bottom of mast 10, the latter is positioned directly under the inner tube 24, the crane or hoist operator, having secured the crane lifting device in the loop 56, lowers the hook assembly 12 down about the mast. The mast enlargement 18 will strike the trigger 76 lifting it against the stop 74. The trigger turns the shaft 80 carrying with it the actuator arm 86 in a clockwise direction. This moves the bottom of actuator link 102 to the left in slot 124 of disc 104. When the right end of the slot strikes the pin 126, disc 106 is rotated counterclockwise. Since disc 106 is keyed to the shaft 96, both the shaft and the jaw attached thereto also turn counterclockwise to the coupling position shown in FIGURE 3. The described operation carries the second jaw clockwise through the action of the jaw throw arms 108, 109 and the the rear connecting lever 110 shown in FIGURE 4, as previously explained. The crane operator then lifts the hook 12, causing the mast enlargement 18 to seat on the jaws 20, as shown in FIGURE 3, whereby continued lifting serves to lift the mast and the load.

At this time, the trigger is free to return to its normal position under the urging of spring 88, and portions of the linkage mechanism such as the link actuator 102, disc 104 therefor turn somewhat in the opposite direction, but reversal of the stub shaft 96, the connected jaw, and the disc 106 are prevented by the engagement of the cam 154 on the right side of the cam follower wheel 176, FIGURE 3, as previously explained. At the end of the described coupling movement of the jaws, the toggle arms 144, 146 have swung past vertical planes including the shafts 96, 98 so that the springs 148, 150 secure against accidental return movements of the jaws to their uncoupling positions. The shoulders at the bottoms of the slots 26 in the inner tube 24 prevent the jaws from further rotation under the weight of the load so that the jaws are held in their coupling positions even under the stress of very heavy loads while the crane is operated to lift the coupling device 10, 12 and the load. To uncouple the hook 12 from a load, the hoist operator merely lowers both until the load rests on a substantially flat surface. A slight additional lowering causes the mast to ride up in the bore of inner tube 24 to move the trigger 76 upwardly against the stop 74. Thus, assuming the parts are in their positions of FIGURE 3, the upward movement of the trigger causes movements of the actuator arm 86 and actuator link 102 to rotate the lower end of the actuator link and the disc 104 connected thereto in a clockwise direction. Through cooperation of the pin 126 and slot 124, the disc 106 is rotated in the same direction turning the shaft 96 and jaw fixed thereto clockwise into the slots 26 and 100. As previously explained, the jaw connected to shaft 98 will turn in the opposite direction, so that both jaws are moved to their uncoupling positions, the mast enlargement 18 being elevated to permit these movements. Meanwhile, the toggle arms 144, 146 will swing outwardly, over center with the shafts 96, 98 to hold the jaws in their uncoupled positions against accidental movement. The hoist operator may then lift the hook 12 free of the mast 10 without interference by the jaws 20. At this time, the actuator link and the trigger return to their normal positions, but cam 154 prevents reversal of disc 106, as previously explained.

It should be clear from the above, that the described device is self-coupling, coupling with the load taking place automatically by merely lowering the hook assembly 12 over the mast 10 and subsequently raising the hook. Thus, coupling is accomplished by a sequence of two opposite movements in the same vertical line. Correspondingly, to uncouple the load, the hook 12 is first lowered vertically and upon triggering is then elevated to free the load. Obviously, these simple movements can be performed easily by the crane operator without the need for assistance by another man, or men, positioned at the load and coupling device. Furthermore, the construction of the device is such that once coupled, the load is safely held and carried by the hoist without danger of uncoupling. Even swinging movements and striking of either the coupling device or the load against a foreign object will not uncouple the device, it being necessary to follow the described sequence of movements in a straight line, first in one direction and then in the opposite direction to accomplish the uncoupling. While the preferred embodiment entails vertical coupling and uncoupling movements, the device may be modified to utilize movements in other directions.

What is claimed is:

1. An automatic coupling hook for hoisting heavy loads, comprising a first member having means for attachment to a lifting device, a second member having means for attachment to a load, means on said first member defining a path for coupling and uncoupling movements of said second member with respect to said first member, a jaw mounted on said first member to move from an uncoupling position out of said path to a coupling position in said path wherein the jaw engages a portion of said second member to block uncoupling, a trigger extending into said path to be struck by said second member during coupling movement of the second member, and link mechanism connecting said trigger to said jaw operative to move the jaw to said coupling position from said uncoupling position and to said uncoupling position from said coupling position when actuated by movement of the trigger.

2. A coupling hook according to claim 1, wherein is provided a pair of said pivoted jaws rotated in opposite directions by said link means when actuated by the trigger.

3. A coupling hook according to claim 2, wherein said second member includes an elongated mast, said portion of the mast engaged by said jaws being an enlargement disposed at one end of the mast.

4. A coupling hook according to claim 3, wherein said means defining a path for coupling movement comprises a vertical tube whose bore guides movement of said enlargement on the mast during coupling and uncoupling, said tube having slots permitting movements of said trigger and jaws across the bore of the tube.

5. A coupling hook according to claim 4, wherein said trigger is positioned near the upper end of said tube and above the jaws when disposed in their coupling positions.

6. A coupling hook according to claim 5, wherein the lower end of said tube is provided with an outwardly flared mouth to guide the mast enlargement inwardly and upwardly into the tube bore.

7. A coupling hook according to claim 4, wherein said trigger is fixed to a pivot shaft, said link mechanism comprising an actuator arm secured at one end to said pivot shaft, an actuator link pivotally secured at one end to the other end of said actuator arm, second and third shafts pivotally mounting said pair of jaws, and means connecting the other end of said actuator link to said second and third shafts operative to rotate the jaws to either coupling or uncoupling positions.

8. A coupling hook according to claim 7, wherein said means connecting the actuator link to said second and third shafts comprises a first disc rotatably mounted on the second shaft and pivotally connected to the actuator link, a second disc fixed to the second shaft, said first disc having a slot shaped as a segment of a circle and coaxial with the second shaft, said second disc having a pin protruding therefrom and riding in said slot whereby turning of the first disc results in turning of the second disc and second shaft with a degree of lost motion determined by the arcuate length of the slot, and means connecting the second and third shafts to turn in opposite directions.

9. A coupling hook according to claim 8, wherein said means connecting the second and third shafts comprises a pair of jaw throw arms each fixed to one of said shafts at one end and a connecting link pivoted to the other ends of said jaw throw arms.

10. A coupling hook according to claim 9, wherein said connecting link is formed of a pair of telescoping members urged apart by a biasing means.

11. A coupling hook according to claim 8, wherein is further provided a pair of toggle arms each connected at one end to one of said second and third shafts, and a pair of biasing elements each fastened at one end to the other end of one of said toggle arms and at the other end to said first member whereby to positively hold said second and third shafts and jaws in their coupling and uncoupling positions, the toggle arms being mounted to swing over center of said shafts in both of said positions.

12. A coupling hook according to claim 7, wherein an adjustable stop is provided at the upper end of said tube to limit upward movement of the trigger, and biasing means is connected to said actuator arm to oppose upward movement and return the trigger to its initial position when the enlargement on the mast is lowered out of engagement with the trigger.

13. A coupling hook according to claim 12, wherein said actuator link comprises a pair of telescoping parts urged apart by biasing means.

14. A coupling hook according to claim 8, wherein is further provided a cam mounted on said second shaft to rotate therewith, a cam follower arm pivoted at one end to said first disc, a cam follower wheel rotatably mounted on the other end of said arm, and biasing means urging said arm in a direction to engage said wheel against said cam, said cam, arm and wheel being so arranged that turning of the second shaft in either direction actuated by said trigger and link mechanism will cause the cam to override the follower wheel depressing the follower arm against the urging of said biasing means but reversal of turning of the second shaft as caused by return of the trigger to its initial position is prevented by engagement of the cam and cam follower wheel with insufficient force to overcome the force of the biasing means.

15. A coupling hook according to claim 8, wherein is further provided a cam mounted on said second shaft to rotate therewith and cam follower means pivoted on said first disc and biased to a locking position in which the cam and shaft are prevented from reversal when the first disc reverses and returns toward an initial position after turning actuated by the trigger.

References Cited
UNITED STATES PATENTS

| | | | |
|---|---|---|---|
| 3,031,222 | 4/1962 | Stewart | 294—110 |
| 3,167,345 | 1/1965 | Dukes | 294—83 |
| 3,285,650 | 11/1966 | Dukes | 294—83 |

EVON C. BLUNK, *Primary Examiner.*

R. D. GUIOD, *Assistant Examiner.*